(12) United States Patent
Erler et al.

(10) Patent No.: US 11,868,209 B2
(45) Date of Patent: Jan. 9, 2024

(54) METHOD AND SYSTEM FOR SEQUENCING DATA CHECKS IN A PACKET

(71) Applicant: Ampere Computing LLC, Santa Clara, CA (US)

(72) Inventors: Matthew Robert Erler, Portland, OR (US); Robert James Safranek, Portland, OR (US); Robert Joseph Toepfer, Portland, OR (US); Sandeep Brahmadathan, Dublin, CA (US); Shailendra Ramrao Chavan, Brentwood, CA (US); Jonglih Yu, Sunnyvale, CA (US)

(73) Assignee: Ampere Computing LLC, Santa Clara, CA (US)

( * ) Notice: Subject to any disclaimer, the term of this patent is extended or adjusted under 35 U.S.C. 154(b) by 0 days.

(21) Appl. No.: 18/046,453

(22) Filed: Oct. 13, 2022

(65) Prior Publication Data

US 2023/0058854 A1 Feb. 23, 2023

Related U.S. Application Data

(63) Continuation of application No. 17/349,601, filed on Jun. 16, 2021, now Pat. No. 11,481,270.

(51) Int. Cl.
*G06F 11/00* (2006.01)
*G06F 11/10* (2006.01)
*G06F 13/42* (2006.01)

(52) U.S. Cl.
CPC ...... *G06F 11/1004* (2013.01); *G06F 13/4221* (2013.01); *G06F 13/4282* (2013.01); *G06F 2213/0024* (2013.01); *G06F 2213/0026* (2013.01)

(58) Field of Classification Search
CPC ............ G06F 11/1004; G06F 13/4221; G06F 13/4282; G06F 2213/0024; G06F 2213/0026
See application file for complete search history.

(56) References Cited

U.S. PATENT DOCUMENTS

| | | | | |
|---|---|---|---|---|
| 4,074,230 A | * | 2/1978 | Icenbice, Jr. | H04L 1/06 375/267 |
| 4,447,902 A | * | 5/1984 | Wilkinson | H04N 5/945 714/E11.053 |
| 5,719,885 A | * | 2/1998 | Ofer | G06F 11/1076 714/E11.034 |

(Continued)

*Primary Examiner* — Albert Decady
*Assistant Examiner* — Enamul M Kabir
(74) *Attorney, Agent, or Firm* — Muncy, Geissler, Olds & Lowe, P.C.

(57) ABSTRACT

The system or device may build one or more data packets by dividing a given payload for a packet into data blocks and inserting data checks for each data block sequentially into the packet payload. The device may generate, for each of the data blocks, a corresponding data check block corresponding to data in each data block. The device may send or arrange the data blocks and the corresponding data check blocks such that each of the data blocks is followed by the corresponding error check block in the packet. Using the corresponding check block, each of the data blocks is independently verifiable, so that the data blocks may be used upon receipt, even if the payload is not completely received.

20 Claims, 5 Drawing Sheets

| Header 412 | Message 411 | Error Check 414 | Message 413 | Error Check 416 | Message 415 | Error Check 418 |
|---|---|---|---|---|---|---|

(56) References Cited

U.S. PATENT DOCUMENTS

| | | | | |
|---|---|---|---|---|
| 6,161,207 A | * | 12/2000 | Lockhart | H04Q 11/0478 |
| | | | | 370/473 |
| 7,712,006 B1 | | 5/2010 | Miller | |
| 2008/0091857 A1 | * | 4/2008 | McDaniel | H04L 63/123 |
| | | | | 710/72 |
| 2009/0177943 A1 | * | 7/2009 | Silvus | H03M 13/293 |
| | | | | 714/755 |
| 2010/0220595 A1 | * | 9/2010 | Petersen | H04L 12/4633 |
| | | | | 370/235 |
| 2011/0022935 A1 | * | 1/2011 | McDaniel | H04L 63/123 |
| | | | | 726/22 |
| 2011/0029832 A1 | * | 2/2011 | Birmingham | H04L 1/1819 |
| | | | | 714/E11.131 |
| 2014/0016486 A1 | * | 1/2014 | Schzukin | H04L 49/10 |
| | | | | 370/252 |
| 2015/0180507 A1 | * | 6/2015 | Willey | G06F 13/4282 |
| | | | | 714/758 |
| 2016/0231939 A1 | * | 8/2016 | Cannata | G06F 3/0605 |
| 2019/0294579 A1 | * | 9/2019 | Das Sharma | G06F 13/4282 |
| 2019/0372705 A1 | * | 12/2019 | Van Wyk | H04L 1/0011 |
| 2020/0012555 A1 | * | 1/2020 | Das Sharma | H04L 1/009 |
| 2021/0105229 A1 | * | 4/2021 | Pandey | H04L 61/5038 |
| 2021/0279126 A1 | * | 9/2021 | Linsky | G06F 11/1004 |

\* cited by examiner

METHOD AND SYSTEM FOR SEQUENCING DATA CHECKS IN A PACKET

CROSS-REFERENCE TO RELATED APPLICATIONS

The present Application for Patent is a Continuation Application of U.S. patent application Ser. No. 17/349,601, entitled "METHOD AND SYSTEM FOR SEQUENCING DATA CHECKS IN A PACKET," filed Jun. 16, 2021, which is assigned to the assignee hereof and expressly incorporated herein by reference in its entirety.

BACKGROUND

I. Field of the Disclosure

The technology of the disclosure relates generally to generating and ordering data checks for data blocks, and specifically to the insertion of data checks into the payloads of packets.

II. Background

The peripheral component interconnect express (PCIe) communication standard was developed for broad-based usage by a wide variety of computing devices from computer fans to virtual reality goggles. Rather than take a minimalist approach to achieve broad usability, the PCIe standard uses several communication layers to abstract away from the hardware interface. For instance, a piece of data would need to pass through the protocol layer, the transport layer, the data link layer, and the physical/electrical layers of the PCIe interface before actually leaving the interface as a signal. Such extensive translation and packaging creates latency and requires power and processing to accomplish.

For communication within hardware components such as a CPU or a system-on-a-chip (SoC), these multiple layers, processes, and the resulting inefficiencies make communication via compliant PCIe unworkable. Furthermore, the primary data blocks (called messages) of the protocol layer of the PCIe interface standard are not flexible in format or arrangement. That is, not all data fits appropriately in such messages. This is especially true for small data pieces such as flags, bit counters, and the like. Indeed, within a CPU or SoC conventional data exchanges do tend to be minimalist with little routing intelligence. Such minimalism can create its own issues on large SoC implementations. Thus, the present options for fast hardware communication provide either too much overhead processing or too little overhead.

Accordingly, conventional implementations of PCIe compliant interfaces and flit-based connections are increasingly inefficient for on-chip communication. Therefore, it is an object of this invention to address many of these deficiencies with the conventional implementation.

SUMMARY

The following presents a simplified summary in order to provide a basic understanding of some aspects described herein. This summary is not an extensive overview of the disclosed subject matter. It is intended to neither identify key nor critical elements of the disclosure nor delineate the scope thereof. Its sole purpose is to present some concepts in a simplified form as a prelude to the more detailed description that is presented later.

The system or device may build one or more data packets by dividing a given payload for a packet of the one or more data packets into at least two data blocks. The device may then generate, for each of the at least two data blocks, a corresponding error check block corresponding to data in each of the at least two data blocks. The device may send or arrange the at least two data blocks and the corresponding error check blocks such that each of the at least two data blocks is followed by the corresponding error check block in the packet. Each of the at least two data blocks is independently verifiable based on the corresponding error check block, even if the payload is not completely received, so that payload elements may be used upon receipt.

For example, the error checking for the first packet and/or the payload may be provided only via the corresponding error check blocks that follow each data block. In another example, the device may generate a final error check block that is based on all data in the payload including the corresponding error check blocks or may generate a final error check block that is based on the data in the data blocks of the payload. The corresponding error check blocks may be one or more parity bits, a cyclical redundancy check (CRC), a hash code, an error correction code, or other data check.

The data blocks may be flits in one implementation. Furthermore, the payload size for the packet may be determined by selecting a number of the at least two data blocks for inclusion in the payload or the payload size for the packet may be determined based on the number of data blocks received during a defined period, where the defined period may be defined at a beginning by a valid code and at an end by a de-assert code. The header for the packet may be generated by the device (e.g., transmitting device) such that the header is a transaction layer packet (TLP) header or a link layer packet header with framing information. These layers or particular layer features being described further below.

After generating the corresponding error check blocks, the corresponding error check blocks may be output to a payload assembly component for sequencing. That is, the payload assembly component organizes the data blocks and error check blocks arriving from different components into a sequential payload. Before sending the payload, which includes the data blocks and the corresponding error check blocks, the payload assembly component sequentially inserts the corresponding error check block following each of the at least two data blocks to build the payload.

A transmitter may build packets according to these processes. Once the packet is built, the transmitter outputs the data blocks and the corresponding error check blocks over one or more common output lines, each of the one or more common output lines carrying both the at least two data blocks and the corresponding error check blocks. That is, the common output lines are shared for both types of data (i.e., the payload as a whole). The data blocks in the payload may not comply with PCIe protocol requirements and, specifically, may not be PCIe messages.

A receiver may obtain incoming packets built according to this process. The receiver decodes and verifies each data block of the at least two data blocks upon receipt of the corresponding error check block for each data block. The receiver may obtain the data blocks and the corresponding error check blocks over one or more common input lines, each of the one or more common output lines carrying both the at least two data blocks and the corresponding error check blocks. That is, the common output lines are shared for both types of data (i.e., the payload as a whole).

A device for transmitting one or more data packets with intermediate data checks may include a buffer storing data blocks, a payload component dividing a payload for a packet of the one or more data packets into the data blocks, and an error check component generating, for each of the at least two data blocks, a corresponding error check block corresponding to data in each of the at least two data blocks. The payload component may insert the data blocks into the payload and provide additional sequencing functions. The device may then transmit the packet including the data blocks and the corresponding error check blocks such that each of the data blocks is followed by the corresponding error check block. Each of the data blocks may be independently verifiable at the receiver based on the corresponding check block, even if the payload is not completely received. That is, upon receipt of each data block and its corresponding error check block, the receiver decodes the data block and outputs it for use.

The following description and the annexed drawings set forth in detail certain illustrative aspects of the subject disclosure. These aspects are indicative, however, of but a few of the various ways in which the principles of various disclosed aspects can be employed and the disclosure is intended to include all such aspects and their equivalents. Other advantages and novel features will become apparent from the following detailed description when considered in conjunction with the drawings.

DETAILED DESCRIPTION

Figure 1:
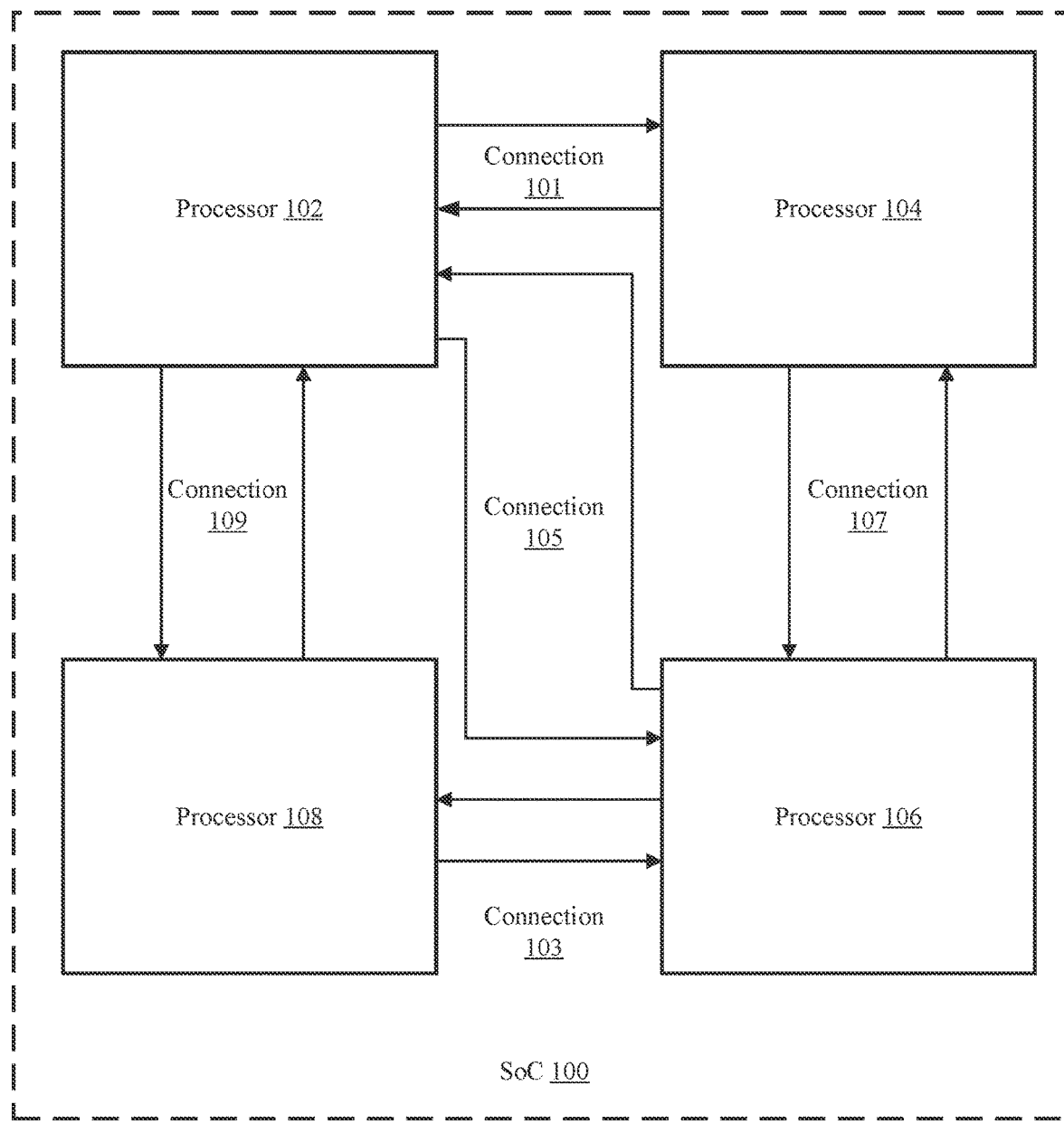
FIG. 1 is a schematic of hardware components and connections on a system-on-a-chip according to an implementation.

The disclosure herein is described with reference to the drawings, wherein like reference numerals are used to refer to like elements throughout. In the following description, for purposes of explanation, numerous specific details are set forth in order to provide a thorough understanding of the subject innovation. It may be evident, however, that various disclosed aspects can be practiced without these specific details. In other instances, well-known structures and devices are shown in block diagram form in order to facilitate describing the subject innovation.

The word "exemplary" is used herein to mean "serving as an example, instance, or illustration." Any implementation described herein as "exemplary" is not necessarily to be construed as preferred or advantageous over other embodiments. Likewise, the term "implementation" does not require that all implementations include the discussed feature, advantage, or mode of operation.

The terminology used herein describes particular implementations only and should not be construed to limit any implementations disclosed herein. As used herein, the singular forms "a," "an," and "the" are intended to include the plural forms as well, unless the context clearly indicates otherwise. Those skilled in the art will further understand that the terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Various components as described herein may be implemented as application specific integrated circuits (ASICs), programmable gate arrays (e.g., FPGAs), firmware, hardware, software, or a combination thereof. Further, various aspects and/or embodiments may be described in terms of sequences of actions to be performed by, for example, elements of a computing device. Those skilled in the art will recognize that various actions described herein can be performed by specific circuits (e.g., an application specific integrated circuit (ASIC)), by program instructions being executed by one or more processors, or by a combination of both. Additionally, these sequences of actions described herein can be considered to be embodied entirely within any form of non-transitory computer-readable medium having stored thereon a corresponding set of computer instructions that upon execution would cause an associated processor to perform the functionality described herein. Thus, the various aspects described herein may be embodied in a number of different forms, all of which have been contemplated to be within the scope of the claimed subject matter. In addition, for each of the aspects described herein, the corresponding form of any such aspects may be described herein as, for example, "logic configured to", "instructions that when executed perform", "computer instructions to" and/or other structural components configured to perform the described action.

Those of skill in the art will further appreciate that the various illustrative logical blocks, components, agents, IPs, modules, circuits, and algorithms described in connection with the aspects disclosed herein may be implemented as electronic hardware, instructions stored in memory or in another computer readable medium and executed by a processor or other processing device, or combinations of both. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, processors, controllers, components, agents, IPs, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium or non-transitory storage media known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

FIG. 1 illustrates a system-on-a-chip (SoC) 100 with four processors: processor 102, processor 104, processor 106, and processor 108. These processors are connected by connection 109 between processors 102 and 108, by connection 103 between processors 108 and 106, by connection 101 between processors 102 and 104, by connection 107 between processors 104 and 106, and by connection 105 between processors 102 and 106. As illustrated, each of these connections 101, 103, 105, 107 and 109 may include transmit and receive connections as illustrated between one or more transmitters and receivers in each of the processors so that transmissions can be sent between processors on separate uni-directional paths. In addition, one or more electrical connecting lines may form the connections in either or both directions of each connection 101, 103, 105, 107 and 109. The number of processors illustrated is merely exemplary and more are contemplated on the SoC 100, including implementations with more than 100 processors. Further, although the illustrated aspect of FIG. 1 shows all of processors 102, 104, 106, and 108 as part of the same physical SoC 100, alternate aspects where some of the processors are part of a first SoC while other processors are part of a second SoC, and at least some of the connections between the SoCs or processors are through a motherboard, platform, or the like are possible, and are within the scope of the teachings of the present disclosure. The connections may collectively be called a fabric or fabric interconnect.

One type of communication that may occur via the connections 101, 103, 105, 107 and 109 is agent-to-agent communication (e.g., processor to processor or component to component) via a protocol based on flow control units or flits (also called fabric packets). These flits may also be transmitted directly over electrical connections between hardware components of the SoC 100. The protocol may operate by establishing a dedicated virtual channel and/or a dedicated physical connection between two components for one or more clock cycles using a leading notification/request to the receiver and a flag to hold the connection live and dedicated. The flag may be a flit valid bit stored on a register until cleared or may be a port/input that is asserted/deasserted. While the flag is valid and after the pathway (virtual/physical) is established, all data blocks or flits transmitted over a separate line are from the same linked transmitting device or logic element. Some basic acknowledgement (ACK) and/or negative-acknowledgement (NAK) functionality is also provided with flits to ensure successful transmission. Additional features of the flit communication protocol may be found in U.S. Pat. No. 7,712,006 which is herein incorporated by reference in its entirety.

These flits have minimal overhead but consume silicon area and power with their dedicated transmission pathways. Furthermore, depending on the routing functionality of the agents or components, the flits may take inefficient routes and may be diverted through several components before reaching their destination. In other words, the routing intelligence of flits by themselves is low. This may cause undesirable latency when the number of processor cores is far higher than the four cores illustrated. Specifically, any component connected to the interconnect fabric may be a node or router of the flits. The nodes may connect, forward, and route the flits according to various rules and configurations such as a crossbar switch, a ring interconnect, a point-to-point mesh fabric, a mesh with diagonal interconnects, and other configurations. On large systems-on-a-chip, this routing can become complex and latency can increase as paths become scarce.

Accordingly, to avoid the constraints that arise from dedicated channels and to maintain latency predictability, the flits may be combined based on certain criteria into payloads of larger packets. These packets may then be provided with headers that enable more intelligent routing. The criteria which are used to combine the flits may include the flag status of the flit channel, the clock cycles of the flit channel, the maximum latency tolerated by the flit channel or the receiving component, and other routing-based criteria. For example, flits that are associated with a head flit and/or form a single transmission may be combined into a payload. This payload may then be provided with a transaction layer header or a framing token header that may follow the standards for such headers as described in the PCIe transaction layer protocol. The application of the header to the payload and other features of the packet are described in more detail with respect to FIGS. 3, 4A, and 4B below.

Another design consideration is that packets with intelligent routing headers and packet-based data checks may introduce latency when applied to the fabric of connections 101, 103, 105, 107 and 109. When a packet is provided with a data check or redundancy code following the payload that is generated based on the entire payload, this may require that the entire packet or payload be compiled before sending can begin and may require that the entire packet is received and the data checked before any part of the payload can be used. This packet building and receipt delay also introduces latency and diminishes the just-in-time nature of flits under good conditions.

Figure 2:
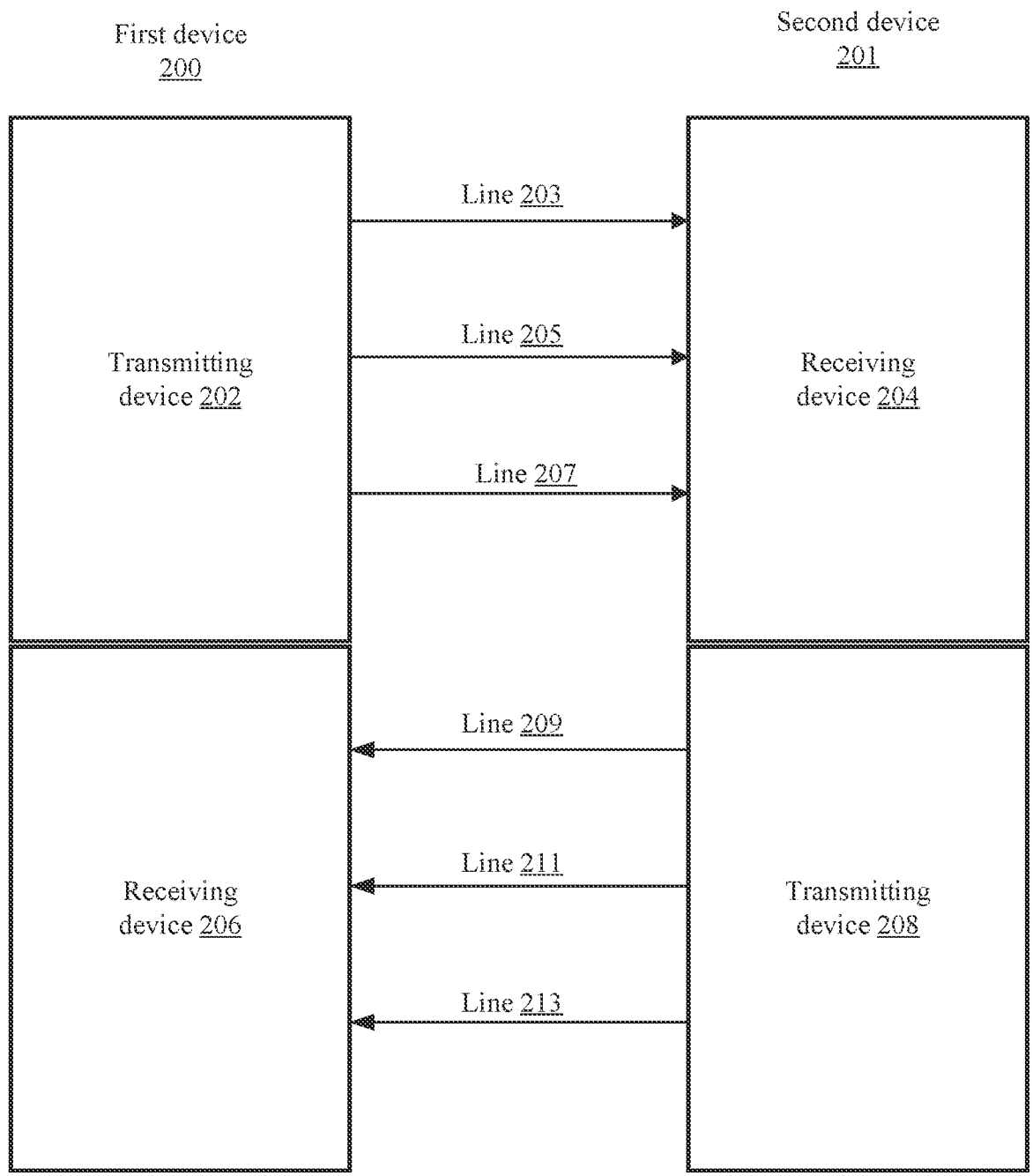
FIG. 2 is a schematic of connections between receivers and transmitters of two devices according to an implementation.

To provide the benefits of just-in-time agent-to-agent communication via the connections 101, 103, 105, 107 and 109 as well as to improve routing and resource allocation, the connections 101, 103, 105, 107 and 109 between transmitters and receivers may be designed as illustrated in FIG. 2. That is, each of the hardware components on the SoC 100 such as processors 102, 104, 106 and 108 may include one or more transmitters and receivers as in FIG. 2. The communication lines between transmitter and receiver may include three electrical connections.

A first device 200 shown in FIG. 2 may include a transmitting device 202 and a receiving device 206. Likewise, a second device 201 may include a receiving device 204 and a transmitting device 208. The transmitting device 202 may communicate or be electrically connected to the receiving device 204 via line 203, line 205, and line 207. Line 203 may carry the length data for the packet. Line 205 may carry the payload data of the packet including data checks, data blocks, and flits. Line 207 may carry the sequence numbering information of the packet. Lines 203, 205 and 207 may utilize electrical signals according to various encodings to send their respective information. For example, the electrical signals may conform with the electrical or physical layer of the PCIe interface standard. These physical connections may conform with any of the technical specifications of the PCI, PCI-X, and PCIe interfaces (e.g., 1.0, 2.0, 3.0, 4.0, 5.0, and other decimal iterations in between). The technical specifications of PCIe 3.0, 4.0, and 5.0 are each hereby incorporated by reference in their entirety.

Likewise, receiving device 206 of the first device 200 may receive signals over three lines 209, 211, and 213 from transmitting device 208 of the second device. Line 209 may carry the length data for the packet. Line 211 may carry the payload data of the packet including data checks, data blocks, and flits. Line 213 may carry the sequence numbering information of the packet. These physical connections may also conform to any of the technical specifications of the PCI, PCI-X, and PCIe interfaces. The other interface layers of these standard interfaces such as the transaction layer, protocol layer, and even the data link layer may not be implemented. Thus, the interfaces and communication between transmitting devices 202 and 208 and receiving devices 204 and 206 may not comply with any of these standards and specifically may not comply with PCIe.

The transmitter device 202 and the receiving device 206 may be combined into a transceiver which then transmits and receives the packets via three bidirectional lines or manages all six connecting lines 203, 205, 207, 209, 211, and 213. Conventional PCIe connections may have four lines with an additional line for transmitting data checks for the payload. Due to the different packet structure for this system, that additional data check line (e.g. CRC line) is not included or required in this communication system of FIG. 2. The data check features of this communication interface are disclosed in more detail with respect to FIG. 4B. Nevertheless, the configuration of the data checks for packets in this communication interface enable the reduced connection lines illustrated in FIG. 2.

Where the payloads of the packets include basic data elements such as flits, the transmitter device 202 and receiving device 206 within the first device 200 may exchange such data elements directly using those protocols. That is, a packet received at receiving device 206 may be unpacked into flits, the flits may be transmitted using the flit protocol to transmitting device and then may be re-packaged and re-transmitted as a packet from transmitting device 202, for example. Such re-transmission may be to another device besides the second device 201. Likewise, the second device 201 may perform such re-transmission and may connect the transmitting device 208 to the receiving device 204 via a flit interface. In other words, the transmitting devices 202 and 208 and the receiving devices 204 and 206 may include flit interfaces to receive, transmit, or output flits after the packets of the communication interface have been disassembled. The retransmission may also occur with the translation and unpacking by simply forwarding the packet after basic data checks as described later with respect to FIG. 4B.

Figure 3:
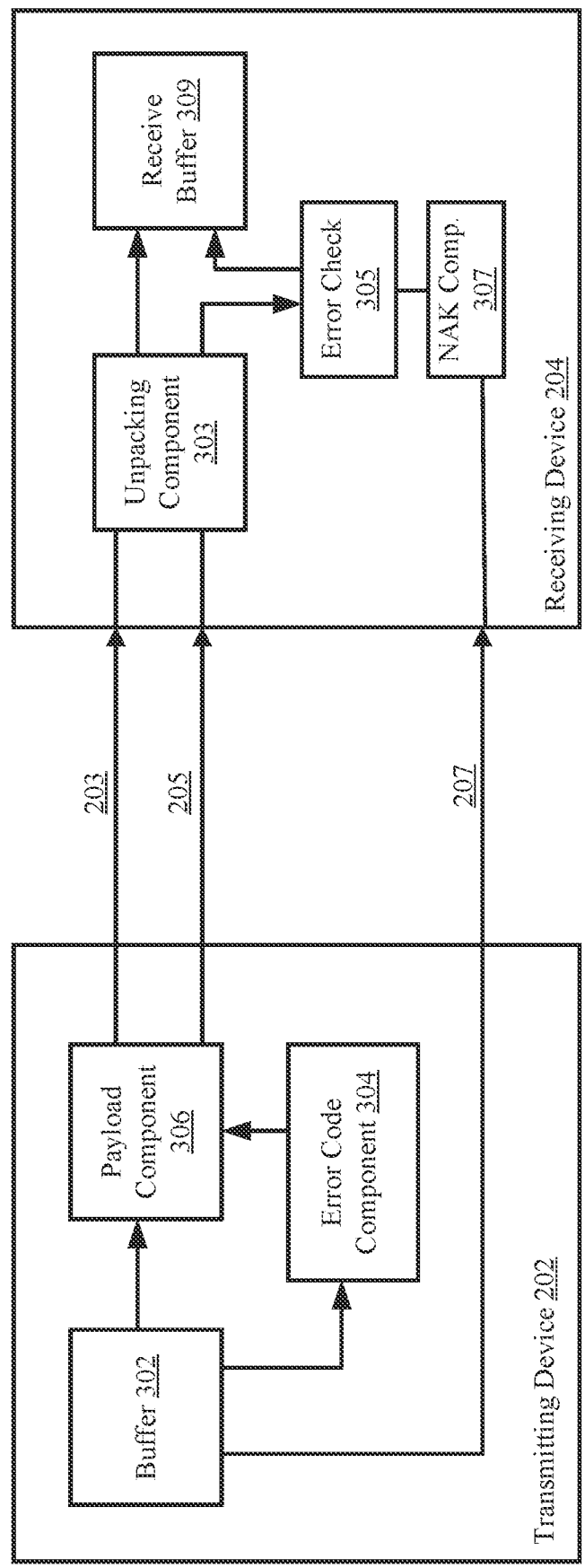
FIG. 3 is a block diagram of hardware components in receivers and transmitters according to an implementation.

The transmitting device 202 and receiving device 204 are illustrated in more detail in FIG. 3 where internal components are also shown. A buffer 302, which may be a replay buffer, initially stages and holds data blocks for transmission in non-transitory computer readable media. The buffer 302 may arrange and store sequences of data payloads together with their length and their corresponding index or sequence number. The buffer 302 may also store only the data payloads with a corresponding index or sequence number. The buffer 302 may output each of the data blocks to the error code component 304 and the payload component 306.

At the error code component 304, each data block may be taken separately and used to calculate a fixed-length binary hash code based on the binary data in the data block. The calculation may include padding of the data block with predetermined bits so as to reach a predetermined or preset block length. This hash code is a corresponding data check or error correcting code that may be reproduced at the receiver based on the same data block following a preconfigured hashing function (e.g., polynomial, key, etc.). This error code may then be supplied to the payload component 306. The error code may also be supplied to the payload component 306 along with the associated data block. The error code may be one or more parity bits, a cyclical redundancy code (CRC), an error correcting code, or other hash of the data block. The error code component 304 may also store all the data blocks for a given payload so that a final error code that covers the entire payload may be calculated. This final error code may be calculated and/or may be a hash of data in the data blocks and their corresponding intermediate error codes.

Within the payload component 306, the data blocks are arranged sequentially according to an index order in the buffer 302 or according to an order of use at the recipient. After each data block in the payload is built, the error code associated with that data block is inserted. The data block may be a flit, a memory request, an acknowledgement, a flag, or other hardware component level communication. The transmitting device 202 may have a latency requirement or may receive a latency requirement from the SoC 100 or other external sources. This latency requirement may determine the size of the payload or, in other words, the number of data blocks which will be inserted into a single payload before transmission. The latency requirement may vary for different recipients (e.g., processor 102 or processor 106).

The payload construction by the payload component 306 may be terminated based on direct instructions from the hosting device (e.g., first device 200) or the source of the data in the data block. For a fixed payload size, the payload component may divide the payload into one or more data blocks and reserve room for fixed-length error codes. The clock cycles or flag indicators of inputs to the first device 200 may be used to signal or manage termination of the payload by external devices or hardware components. Once payload construction is terminated or completed, the payload component may calculate a payload length and/or may receive one or more length records from the buffer 302. The payload component 306 may then request that the error code component 304 provide any final error code for the whole payload which may have been calculated.

The payload component 306 and/or the transmitting device 202 may then transmit the payload length or packet length via connecting line 203. The payload component 306 and/or the transmitting device 202 may then transmit the payload of sequential data blocks and intermediate error codes across to the receiving device 204 via connecting line 205. In an implementation, the payload component 306 may transmit the payload as it is constructed so that once the intermediate or corresponding error code for a data block is received at the payload component, that block is transmitted. The full length of the resulting payload for the packet may then be sent later, after the payload is completed. This may only be possible in low latency connections or direct connection with no intermediaries.

The buffer 302 may transmit the sequence numbers for each of the data blocks to the receiving device 204 via connecting line 207. The transmitting device 202 may calculate the sequence number from an index value or register number corresponding to the data block. The transmissions from the transmitting device 202 to the receiving device 204 via connecting lines 203, 205, and 207 may conform with encodings defined by any of the PCIe physical layer standards. The intermediate error codes may be simply treated as additional payload data or data blocks until received at the unpacking component 303. The payload may be transmitted via multiple connecting lines 205 for higher bandwidth capabilities.

The receiving device 204 includes at least three inputs corresponding to connecting lines 203, 205, and 207. The unpacking component 303 receives the payload length data and the payload via connecting lines 203 and 205. The unpacking component 303 may segment out the payload into data blocks and their corresponding error codes or data checks immediately upon receipt. Once a data block and its error code are unpacked or decoded, the block and the error code are provided to the error check component 305. The error check component 305 then calculates an error code based on the received data block with the same hash function used on the transmitter side. If the error code calculated at the error check component 305 matches the error code calculated at the error code component 304 and transmitted to the receiving device 204, then the data block is validated and passed to the receive buffer 309. Alternatively, the error check component 305 may compare the calculated error code with an expected residue constant. Once in the receive buffer, the data block may be used by the second device 201 even if the rest of the payload corresponding to the data block has not yet been completely received.

If the error code generated or calculated by the error check component 305 does not match the error code transmitted with the corresponding data block, then the data block is not validated and is not passed to the receive buffer 309. Instead, the error check component 305 informs the NAK component 307 that the data block failed the validation test. The NAK component 307 may then communicate with transmitting device 208 of the second device 201 to have it transmit the NAK and corresponding sequence number of the failed data block back to the transmitting device 202 via the receiving device 206. This arrangement allows for just-in-time use of data blocks without waiting to receive a final data check, thereby reducing latency.

Figure 4A:
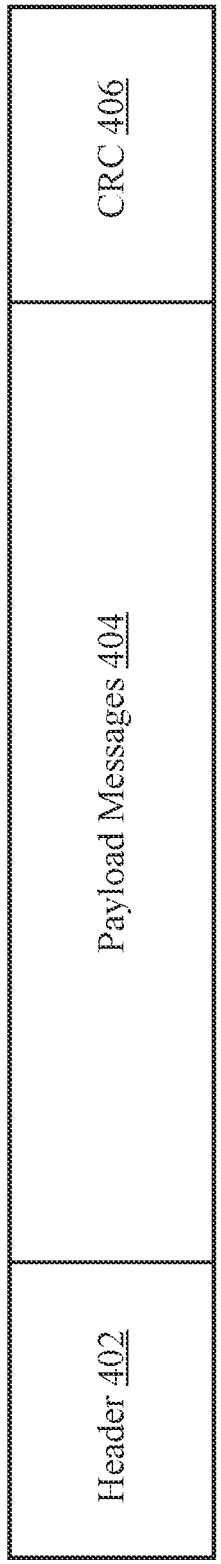
FIG. 4A is a block diagram of a conventional PCIe packet according to an implementation.

In FIG. 4A a conventional PCIe packet is illustrated as defined by the protocol and transaction layers of the PCIe interface standard. The conventional packet includes a header 402 with length information, sequence information, and a header data check code. The payload messages are one or more messages which must comply with the PCIe protocol layer requirements for message types and definitions. Finally, the packet includes a CRC 406 at the end of the packet. Such a packet would require the receipt of the entire packet before beginning the decoding and error checking process, which may cause undesirable performance degradation because, since none of the data can be used until it is all received, an associated processor may be idle.

Figure 4B:
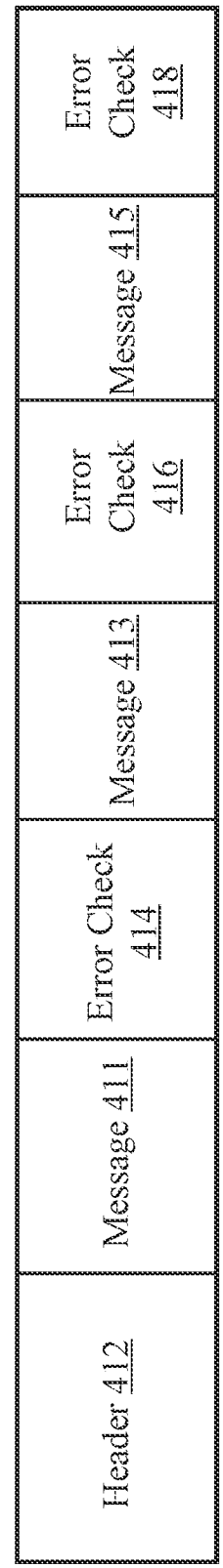
FIG. 4B is a block diagram of a packet with intermediate data check blocks according to an implementation.

In FIG. 4B a packet as created by the transmitting device 202 of FIG. 3 is illustrated. This packet includes a header 412 which may differ from the header 402 but may include length information for the payload, sequence number information, an identifier, and a header data check code. The header 412 may be a framing token, link layer header, and/or transaction layer header. In addition, the packet of FIG. 4B includes messages 411, 413, and 415, for example. Likewise, each of the messages 411, 413, and 415 includes an error check 414, 416, and 418 that sequentially follows the corresponding message. These messages 411, 413, and 415 may not comply with PCIe and, in fact, none of the messages in a payload may comply with PCIe message formats. Indeed, since no CRC 406 for the packet is included and since the header 412 may be different, the packet as a whole may not comply with PCIe. Upon receipt at the receiver, each message may be independently verified based on the following or corresponding error check so that the receiving device may use the message even if the rest of the packet has not been fully received.

In an implementation, the packet of FIG. 4B could additionally be provided with a final error code or data check that covers the whole packet in order to provide further data checks for the receiving device. Validation using such a final error code may not be required before each data block or message validated by the intermediate error checks 414 may be used. The final error code may be a multi-level CRC which may address intermediate CRC implementation issues (e.g., leading bit errors or padding issues) or prevent data tampering. Each of the data blocks (e.g., messages 411, 413, and 415) may be a flit, memory request, flag, or other hardware component message. Message 411, for example, may be a head flit and messages 413 and 415 may be associated data flits.

Figure 5:
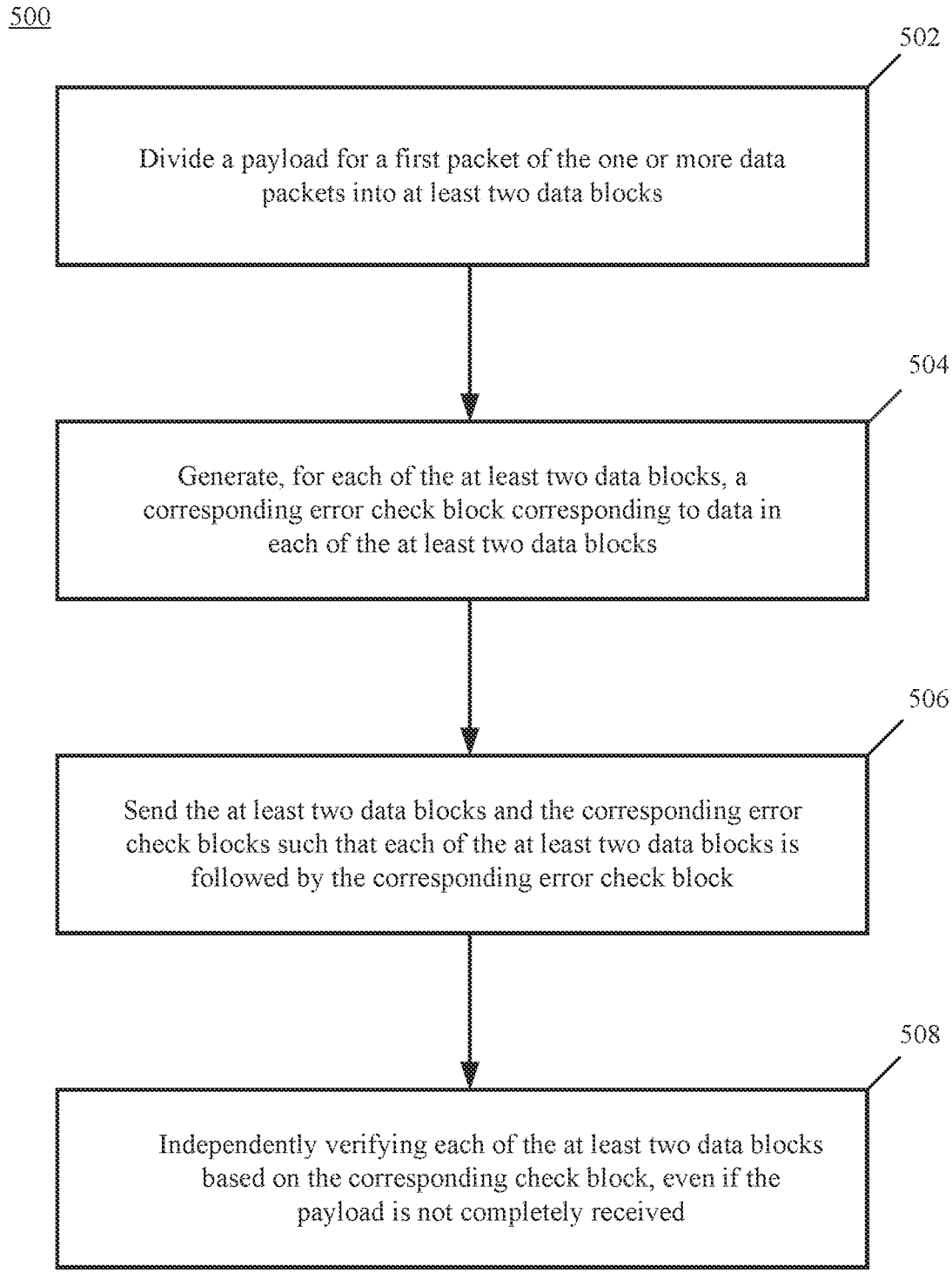
FIG. 5 is a flow chart of a process for building packets according to an implementation.

In FIG. 5 a process 500 for building the packet or payload as described with respect to FIGS. 3 and 4B is illustrated. At 502, a payload of a first data packet of the one or more data packets being transmitted may be divided into at least two data blocks. At 504, the transmitting device (e.g., transmitting device 202) may then generate, for each of the at least two data blocks, a corresponding error check block corresponding to data in each of the at least two data blocks. The corresponding error check blocks may be one or more parity bits, a cyclical redundancy check (CRC), a hash code, or an error correction code. At 506, the transmitting device may then send the at least two data blocks and the corresponding error check blocks such that each of the at least two data blocks is followed by the corresponding error check block.

At 508, the receiver or receiving device (e.g., receiving device 204) connected to the transmitting device where the process 500 is being executed, may independently verify each of the at least two data blocks based on the corresponding error check block, even if the payload is not completely received. The receiver may then pass the data block on to a receive buffer or on to the second device 201 for use without waiting for the arrival of the entire packet or payload. The error checking for the first packet and/or the payload may be provided only via the corresponding error check blocks. After generating the corresponding error check blocks, the corresponding error check blocks may be output to a payload assembly component for sequencing. Likewise, before the sending of the payload including the at least two data blocks and the corresponding error check blocks, a payload assembly component may sequentially insert the corresponding error check block following each of the at least two data blocks to build the payload. The corresponding error check blocks and the data blocks may be transmitted over a common, shared connecting line (e.g., line 205) to the receiver.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations. Thus, the disclosure is not intended to be limited to the examples and designs described herein but is to be accorded the widest scope consistent with the principles and novel features disclosed herein.

The invention claimed is:

1. A method of communication performed by a transmitting device, the method comprising:
   obtaining data blocks, wherein each one of the data blocks includes a flow control unit (flit) or a hardware component message;
   generating, for each one of the data blocks, a respective error check block based on data of the corresponding data block, the data of the corresponding data block being independently verifiable based on the error check block;
   building a packet based on a communication protocol, the packet including a header and a payload, and the payload including the data blocks and the error check blocks, each one of the error check blocks sequentially following the corresponding one of the data blocks in the payload; and
   transmitting the packet based on the communication protocol.

2. The method of claim 1, further comprising:
   generating a final error check block that is based on the data blocks and the corresponding error check blocks, wherein the packet further includes the final error check block.

3. The method of claim 1, wherein the corresponding error check blocks are generated based on one or more of parity bits, a cyclical redundancy check (CRC), a hash code, or an error correction code.

4. The method of claim 1, wherein
   the data blocks are flits, and
   the method further comprising:
      determining a payload size of the packet by selecting a number of the data blocks for inclusion in the payload; or
      determining a payload size of the packet based on a number of the data blocks received during a defined period.

5. The method of claim 4, wherein the defined period being defined as from assertion of a valid code to assertion of a de-assert code.

6. The method of claim 1, further comprising:
   generating the header for the packet, the header being a transaction layer packet (TLP) header or a link layer packet header with framing information.

7. The method of claim 1, wherein the transmitting the packet comprises:
   transmitting the data blocks and the error check blocks over one or more common output lines.

8. The method of claim 7, further comprising:
   transmitting length data of the packet over another line different from the one or more common output lines.

9. The method of claim 7, further comprising:
   transmitting sequential number information of the packet over another line different from the one or more common output lines.

10. The method of claim 1, wherein the communication protocol is a peripheral component interconnect (PCI) protocol or a peripheral component interconnect express (PCIe) protocol.

11. A device, comprising circuitry configured to:
    obtain data blocks, wherein each one of the data blocks includes a flow control unit (flit) or a hardware component message;
    generate, for each one of the data blocks, a respective error check block based on data of the corresponding data block, the data of the corresponding data block being independently verifiable based on the error check block;
    build a packet based on a communication protocol, the packet including a header and a payload, and the payload including the data blocks and the error check blocks, each one of the error check blocks sequentially following the corresponding one of the data blocks in the payload; and
    transmit the packet based on the communication protocol.

12. The device of claim 11, wherein the circuitry is further configured to:
    generate a final error check block that is based on the data blocks and the corresponding error check blocks,
    wherein the packet further includes the final error check block.

13. The device of claim 11, wherein
    the data blocks are flits, and
    the circuitry is further configured to:
       determine a payload size of the packet by selecting a number of the data blocks for inclusion in the payload; or
       determine a payload size of the packet based on a number of the data blocks received during a defined period.

14. The device of claim 13, wherein the defined period being defined as from assertion of a valid code to assertion of a de-assert code.

15. The device of claim 11, wherein the circuitry is further configured to:
    transmit the data blocks and the error check blocks over one or more common output lines.

16. The device of claim 15, wherein the circuitry is further configured to:
    transmit length data of the packet over another line different from the one or more common output lines.

17. The device of claim 15, wherein the circuitry is further configured to:
    transmit sequential number information of the packet over another line different from the one or more common output lines.

18. The device of claim 11, wherein the communication protocol is a peripheral component interconnect (PCI) protocol or a peripheral component interconnect express (PCIe) protocol.

19. A method of communication performed by a receiving device, the method comprising:
- receiving a packet based on a communication protocol, the packet including a header and a payload, and the payload including data blocks and corresponding error check blocks, each one of the error check blocks sequentially following the corresponding one of the data blocks in the payload, wherein each one of the data blocks includes a flow control unit (flit) or a hardware component message;
- prior to the packet being received completely, extracting one of the data blocks and the corresponding error check blocks from a received portion of the packet;
- validating the one of the data blocks based on the corresponding error check block; and
- storing the one of the data blocks in a buffer after the one of the data blocks is validated based on the corresponding error check block.

20. The method of claim 19, wherein the communication protocol is a peripheral component interconnect (PCI) protocol or a peripheral component interconnect express (PCIe) protocol.

* * * * *